(12) United States Patent
Emam et al.

(10) Patent No.: US 7,966,173 B2
(45) Date of Patent: Jun. 21, 2011

(54) SYSTEM AND METHOD FOR DIACRITIZATION OF TEXT

(75) Inventors: Ossama S. Emam, Giza (EG); Ruhi Sarikaya, Shrub Oak, NY (US); Imed Zitouni, White Plains, NY (US)

(73) Assignee: Nuance Communications, Inc., Burlington, MA (US)

( * ) Notice: Subject to any disclaimer, the term of this patent is extended or adjusted under 35 U.S.C. 154(b) by 911 days.

(21) Appl. No.: 11/386,626

(22) Filed: Mar. 22, 2006

(65) Prior Publication Data
US 2007/0225977 A1    Sep. 27, 2007

(51) Int. Cl.
G06F 17/27    (2006.01)
(52) U.S. Cl. ............. 704/9; 704/1; 704/2; 704/6; 704/8; 704/235
(58) Field of Classification Search .................. 704/235, 704/1–2, 6, 8–9
See application file for complete search history.

(56) References Cited

U.S. PATENT DOCUMENTS

| | | | | |
|---|---|---|---|---|
| 6,092,034 | A * | 7/2000 | McCarley et al. | 704/2 |
| 6,108,627 | A * | 8/2000 | Sabourin | 704/243 |
| 6,304,841 | B1 * | 10/2001 | Berger et al. | 704/2 |
| 6,411,932 | B1 * | 6/2002 | Molnar et al. | 704/260 |
| 6,442,524 | B1 * | 8/2002 | Ecker et al. | 704/277 |
| 7,136,816 | B1 | 11/2006 | Strom | |
| 7,590,533 | B2 * | 9/2009 | Hwang | 704/231 |
| 7,698,125 | B2 * | 4/2010 | Graehl et al. | 704/5 |
| 2003/0023423 | A1 * | 1/2003 | Yamada et al. | 704/2 |
| 2005/0015237 | A1 * | 1/2005 | Debili | 704/2 |
| 2005/0154580 | A1 * | 7/2005 | Horowitz et al. | 704/9 |
| 2005/0192807 | A1 | 9/2005 | Emam et al. | |
| 2005/0234701 | A1 * | 10/2005 | Graehl et al. | 704/2 |
| 2006/0069545 | A1 * | 3/2006 | Wu et al. | 704/8 |
| 2006/0107200 | A1 | 5/2006 | Ching | |
| 2006/0129380 | A1 * | 6/2006 | El-Shishiny | 704/9 |
| 2006/0184351 | A1 * | 8/2006 | Corston-Oliver et al. | 704/1 |

OTHER PUBLICATIONS

Ananthakrishnan, Sankaranarayanan, Shrikanth S. Narayanan and Srinivas Bangalore (2005) Automatic Diacritization of Arabic Transcripts for Automatic Speech Recognition. In Proceedings of International Conference on Natural Language Processing, Kanpur, India.*

Otakar Smr z and Petr Zem'anek. 2002. Sherds from an Arabic Treebanking Mosaic. Prague Bulletin of Mathematical Linguistics, (78):63 76.*

Mohamed Maamouri, Ann Bies, and Tim Buckwalter. 2004. The penn arabic treebank : Building a largescale annotated arabic corpus. In NEMLAR Conference on Arabic Language Resources and Tools, Cairo, Egypt.*

A. Elgammal and M. Ismail. A graph-based segmentation and feature extraction framework for Arabic text recognition. In Proc.of 6th. Int. Conference on Document Analysis and Recognition, ICDAR 2001, pp. 622-626, Seattle, USA, Sep. 10-13, 2001.*

(Continued)

*Primary Examiner* — Richemond Dorvil
*Assistant Examiner* — Greg A Borsetti
(74) *Attorney, Agent, or Firm* — Wolf, Greenfield & Sacks, P.C.

(57) ABSTRACT

A system and method for restoration of diacritics includes making classification decisions regarding an utterance in accordance with an aggregate of a plurality of information sources in a diacritization model for diacritic restoration. A best diacritic representation is determined for graphemes in the utterance based upon a best match with the diacritization model. A diacritically restored representation of the utterance is output.

17 Claims, 5 Drawing Sheets

OTHER PUBLICATIONS

Dimitra Vergyri and Katrin Kirchhoff. 2004. Automatic diacritization of arabic for acoustic modeling in speech recognition. In COLING 2004 Workshop on Computational Approaches to Arabic Script-based Languages, Geneva, Switzerland.*

Ouersighni R. 2001. A major offshoot of the DIINAR-MBC project: AraParse, a morphosyntactic analyzer for unvowelled Arabic texts, in the proceeding of Arabic NLP Workshop at ACL/EACL.*

Gal, Ya'akov, "An HMM Approach to Vowel Restoration in Arabic and Hebrew", Proceedings of the Workshop on Computational Approaches to Semitic Languages, ACL, Jul. 2002, Philadelphia.*

R. Mihalcea. 2002. Diacritics restoration: Learning from letters versus learning from words. In Proceedings of the Third International Conference on Intelligent Text Processing and Computational Linguistics CICLing 2002, LNCS 2276, pp. 339-348, 2002.*

Grace Ngai, Dekai Wu, Marine Carpuat, Chi-Shing Wang, and Chi-Yung Wang. Semantic role labeling with boosting, SVMs, maximum entropy, SNOW, and decision lists. In Proceedings of Senseval-3, Third International Workshop on Evaluating Word Sense Disambiguation Systems,Barcelona, Jul. 2004. SIGLEX, Association for Computational Linguistics.*

Tufis, D., and Chitu, A. Automatic diacritics insertion in Romanian texts. In Proceedings of the International Conference on Computational Lexicography Complex'99 (Pecs, Hungary, Jun. 1999).*

David Chiang, Mona Diab, Nizar Habash, Owen Rambow, and Saullah Shareef. 2006. Parsing Arabic Dialects. In Proceedings of EACL-Jan. 18, 2006.*

Kirchoff et al. "Novel Speech Recognition Models for Arabic" Johns-Hopkins University Summer Research Workshop 2002.*

Mihalcea. "Diacritics Restoration: Learning from Letters versus Learning from Words" 2002 pp. 339-348.*

Gupta et al. "Maximum Entropy Classification Applied to Speech" 2000.*

Fung et al. "A Maximum-Entropy Chinese Parser Augmented by Transformation-Based Learning" Sep. 2004.*

Maison et al. "Pronunciation Modeling for Names of Foreign Origin" 2003.*

Berger. "The Improved Iterative Scaling Algorithm: A Gentle Introduction" 1997.*

Lau et al. "Adaptive Language Modeling Using the Maximum Entropy Principle" 1993.*

Chen. "Conditional and Joint Models for Grapheme-to-Phoneme Conversion" 2003.*

Mihalcea et al. "Leter Level Learning for Language Independent Diacritics Restoration" 2002.*

Pan et al. "Estimation of the joint probability of the multisensory signals" 2001.*

Berger et al. "A Maximum Entropy Approach to Natural Language Processing" 1996.*

Charniak. "A Maximum-Entropy-Inspired Parser" 2000.*

R. Nelken et al. "Arabic Diacritization Using Weighted Finite-State Transducers", Proc. ACL-05 Workshop on Computational Approaches to Semitic Languages, Ann Arbor, Michgan, 2005; pp. 79-86.

Ya'Akov Gal, "An HMM Approach to Vowel Restoration in Arabic and Hebrew", Proc. ACL-02 Workshop on Computational Approaches to Semitic Languages, 2002; 7 pages.

El-Imam, "Phonetization of Arabic: rules and algorithms", Computer Speech and Language, vol. 18, 2003 pp. 339-373.

Katrin Kirchhoff et al. "Cross-Dialectal Data Sharing for Acoustic Modeling in Arabic Speech Recognition", SRI International, Menlo Park, CA; Jan. 6, 2005; pp. 1-23.

Simard, M., "Automatic Insertion of Accents in French Text 1998," *Third Conference on Empirical Methods in Natural Language Processing*, p. 1-9.

* cited by examiner

FIG. 5

SYSTEM AND METHOD FOR DIACRITIZATION OF TEXT

BACKGROUND

1. Technical Field

The present invention relates to diacritization (e.g., vowelization) of text and more particularly to a diacritization restoration system and method, which restores missing diacritics from text reproductions of speech and translated text.

2. Description of the Related Art

Arabic documents are composed of scripts without short vowels and other diacritic marks. The written text is actually missing indications of the vowels, since those familiar with reading the language can do so without the vowels being indicated. This often leads to a considerable ambiguity since several words that have different diacritic patterns may appear identical in a diacritic-less setting. Educated Modern Standard Arabic speakers are able to accurately restore diacritics in a document. This is based on the context and their knowledge of the grammar and the lexicon of Arabic. However, a document without diacritics becomes a source of confusion for beginner readers and people with learning disabilities.

A document without diacritics is also problematic for video, speech, and natural language processing applications, where a diacritic-less setting adds another layer of ambiguity when processing the data. Examples of these applications are automatic speech-recognition, speech-to-text, information extraction, machine translation, multimedia indexing, etc.

Fully diacritized text is required for text-to-speech applications, where the mapping from graphemes to phonemes is simple (compared to languages such as English and French, for example), and in most cases there is one-to-one relationship for such mapping. Also, using data with diacritics improves the accuracy of speech-recognition applications.

Currently, applications such as text-to-speech, speech-to-text, and others use data where diacritics may be placed manually or by rule based methods, which may be tedious, time consuming to generate and less accurate. A diacritization restoration system that could restore diacritics (i.e. supply the full diacritical markings and consequently a full vocalization), would be of interest to these applications and many other applications. In addition, a diacritic restoration system ("diacritization" and "diacritic restoration" may be used interchangeably throughout this disclosure) would greatly benefit nonnative speakers, sufferers of dyslexia, etc. It also could assist in restoring diacritics of children's and poetry books, a task that is currently done manually, among other things.

Prior to recent attention there have been relatively few studies tackling the diacritization issue in Arabic. Rule based methods based on a morphological analyzer were proposed for vowelization. One rule based method employed a grapheme to sound conversion method. The main disadvantage of rule based methods is that it is difficult to maintain up-to-date rules, or extend the method to new applications due to the productive nature of any "living" spoken language.

More recently, there have been several new studies addressing the diacritization problem. An example is based on a top-down approach adopted where each utterance to be diacritized is compared to the training data for a matching sentence. If there is a match, the whole utterance is used, if not, then phrases from the sentence are extracted to search for matches. Then, the words and finally the character n-gram models are used. New words are diacritized using character based n-gram models.

In another method, conversational Arabic is diacritized by combining morphological and contextual information with the acoustic signal. Here diacritization is treated as an unsupervised tagging problem where each word is tagged as one of the many possible diacritizations provided by a morphological analyzer. An Expectation Maximization (EM) algorithm is used to learn the tag sequences from the training data. An HMM-based diacritization method was also presented where diacritized sentences were decoded from non-diacritized sentences. This method considered a fully word based approach and considered only vowels (no additional diacritics).

Recently, a weighted finite state transducer based algorithm has also been proposed that employs characters and morphological units in addition to words. This method does not appear to handle the case of two syllabification marks (e.g., shedda) showing the doubling of the preceding consonant and sukuun denoting the lack of a vowel.

Even though the methods proposed for diacritization have been maturing and improving over time, they still provide a limited solution to the problem in terms of accuracy and diacritics coverage.

SUMMARY

To restore the most comprehensive list of the diacritics that are used in any Arabic text, embodiments of the present invention differ from the previously described approaches in the way the diacritization problem is formulated and multiple information sources are integrated. The use of a statistical approach, such as, e.g., maximum entropy, may be employed to make a combination of diverse sources of information successful and consequently provide a more accurate and reliable technique for restoring diacritization.

Embodiments of the present invention use multiple information sources and formulate the diacritization or vowelization problem as a search task. Advantageously, the character based generative diacritization method is enabled for words that do not occur in the training data.

A system and method for restoration of diacritics includes making classification decisions regarding an utterance in accordance with an aggregate of a plurality of information sources in a diacritization model for diacritic restoration. A best diacritic representation is determined for graphemes in the utterance based upon a best match with the diacritization model. A diacritically restored representation of the utterance is output.

A system for restoration of diacritics includes a diacritization model configured to make classification decisions regarding an utterance in accordance with an aggregate of a plurality of information sources for diacritic restoration. A processing module is configured to determine a best diacritic representation for graphemes in the utterance based upon a best match with the diacritization model to output a diacritically restored representation of the utterance.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Aspects of the present invention provide systems and methods that ensure a highly accurate restoration of diacritics in language processing and synthetic production. This highly accurate restoration eliminates the cost of manually diacritizing text needed for many applications. While the present disclosure describes the Arabic language and employs Arabic as an example, the principles of the present embodiments may be employed in any language or coding system which employs diacritics or other symbolic equivalents (e.g., Hebrew).

Introduction to Diacritics: As most Semitic languages, Arabic is usually written without diacritical marks. In TABLE 1, diacritics are presented with grapheme ل(lam) to demonstrate where they are placed in the text along with their names and meaning. Arabic has 28 letters (graphemes), 25 of which are consonants and the remaining 3 are long vowels. The Arabic alphabet can be extended to 90 by additional shapes, marks, and vowels. Unlike many other languages short vowels are not represented by letters, hence they are not part of the alphabet. They are written as special symbols either above or below the graphemes.

Here are the three short vowels:

1. The Fatha sign (´) represents the "a" sound and is an oblique dash over a consonant ($3^{rd}$ row in Table 1).

2. The Kasra sign (.) represents the "i" sound and is an oblique dash under a consonant ($4^{th}$ row in Table 1).

3. The Damma sign (´) represents the "u" sound and is a loop over a consonant that resembles the shape of a comma ($5^{th}$ row in Table 1).

In addition to the short vowels presented above, the following diacritics are also found:

1. "Sukuun", written as a small circle (˚) above the Arabic consonant, is used to indicate that the letter is not vowelized (last row in Table 1).

2. "Shadda" (´) is a gemination mark that is placed above the Arabic letters and results in a repetition of the letter at the phonemic level. This diacritic is always combined with short vowels and is assigned to a grapheme.

3. "Nunation" (or tanween) is expressed by one of three different diacritics (Fathatan, Dammatan, Kasratan). These are placed above the last letter of the word and have the phonetic effect of placing an "N" at the end of the word.

Long vowels are constructed by combining 4 graphemes (ي, ا,ى,و) with the short vowels.

TABLE 1

Arabic Diacritics with grapheme ل

| Diacritics with ل | Name | Meaning |
| --- | --- | --- |
| ل | NULL | Vowel absence |
| لَ | Fatha | /a/ |

TABLE 1-continued

Arabic Diacritics with grapheme ل

| Diacritics with ل | Name | Meaning |
| --- | --- | --- |
| لُ | Damma | /u/ |
| لِ | Kasra | /i/ |
| لً | Tanween al-fatha | /an/ |
| لٌ | Tanween ad-damm | /un/ |
| لٍ | Tanween al-kasr | /in/ |
| لْ | Sukuun | Vowel absence |
| لّ | Shadda | Consonant doubling |

In accordance with particularly useful embodiments, a modeling framework for automatic diacritic restoration of documents is provided. A document may have different formats including text, audio, video, multi-media, etc. The framework disclosed herein is based on a statistical principle such as Markov Modeling. The models described herein are particularly useful for diacritic restoration of Arabic, although other languages are also applicable, e.g., Semitic languages, such as Hebrew, etc.).

Each character is modeled as a state emitting a diacritic (or none). The state emission probabilities are modeled using one or more of the combined statistical approaches (e.g. maximum entropy, decision tree, support vector machines, etc.).

The diacritic restoration process is formulated as a search problem where a best diacritic realization is assigned to a given sentence. To each character in the document, a diacritic is assigned from a universal diacritic space. This space is exactly defined by a limited set of diacritics (depending on the diacritization annotation convention) including the null-diacritic. The best diacritization path through the sentence can be found using a Viterbi search in the diacritic search space.

Features used to model state observation probabilities can be any combination of different sources of information, including character context, word context, syntactic, semantic, linguistic information, part-of-speech (POS) tags, parse-tree, etc. These multiple sources can be included in the diacritization parse tree as described below.

The overlapping sources of information in the form of features can be jointly modeled within a probabilistic framework such as maximum entropy, support vector machines, boosting or decision tree based statistical learning methods.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Good performance in a natural language processing applications may depend heavily on integrating diverse sources of information or features. Given the stated focus of integrating many feature types, present embodiments are interested in algorithms that can easily integrate and make selective use of diverse input types. The Maximum Entropy classifier will be illustratively described herein to satisfy these criteria, although other classifiers and systems may be employed.

Maximum Entropy has the ability to integrate arbitrary types of information and make a classification decision by aggregating all information available for a given classification. Maximum Entropy has many advantages over the rule based methods of the prior art. For example, Maximum Entropy permits the use of many information sources and provides flexibility and accuracy needed for changing dynamic language models.

Figure 1:
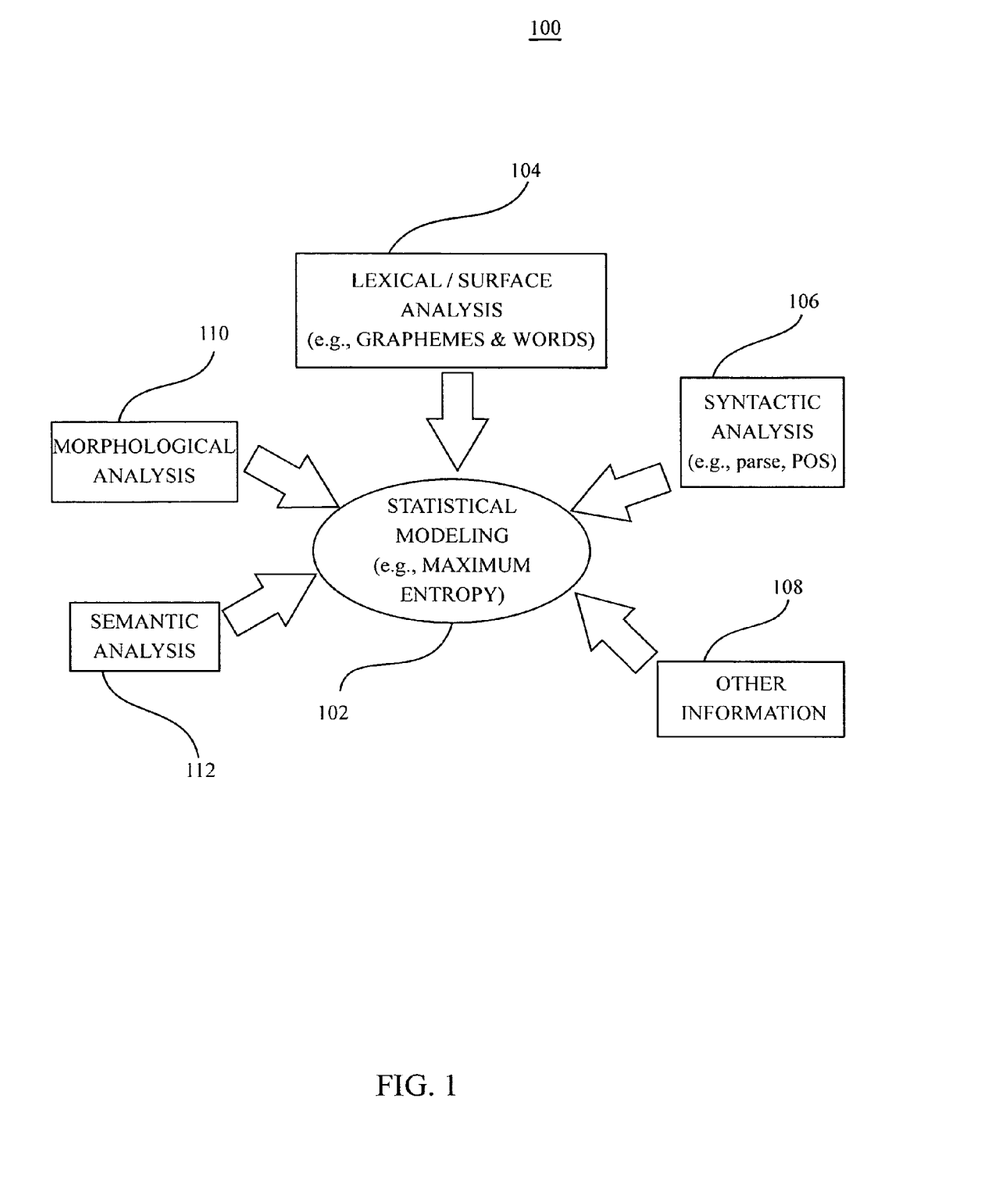
FIG. 1 is a block diagram showing possible information sources employed in statistical modeling of a diacritization model in accordance with an illustrative embodiment.

Referring now to the drawings in which like numerals represent the same or similar elements and initially to FIG. 1, possible information sources are illustratively shown being integrated using Maximum Entropy modeling. Information or features extracted from these sources are used to train a Maximum Entropy model 102.

The Maximum Entropy method is a flexible statistical modeling framework that has been used widely in many areas of natural language processing. Maximum entropy modeling produces a probability model that is as uniform as possible while matching empirical feature expectations. This can be interpreted as making as few assumptions as possible in the model.

Within the maximum entropy framework, any type of feature can be used, enabling the system designer to experiment with different feature types. Maximum entropy modeling permits combinations of multiple overlapping information sources. The information sources may be combined as follows:

$$P(o\mid h) = \frac{e^{\sum_i \lambda_i f_i(o,h)}}{\sum_{o'} e^{\sum_j \lambda_j f_j(o',h)}}$$

This equation describes the probability of a particular outcome (o) (e.g., one of the diacritics) given the history or context. $\lambda_i$ is a weighting function or constant used to place a level of importance on the information being considered for the feature. Note that the denominator includes a sum over all possible outcomes (o'), which is essentially a normalization factor for probabilities to sum to 1. The indicator functions or features $f_i$ are activated when certain outcomes are generated for certain context.

$$f_i(o\mid h) = \begin{cases} 1, & \text{if } o = o_i \text{ and } q_i(h) = 1 \\ 0, & \text{otherwise} \end{cases}$$

where $o_i$ is the outcome associated feature $f_i$ and $q_i$ (h) is an indicator function for histories. The maximum entropy models may be trained using improved iterative scaling, which is known in the art.

The multiple sources of information in statistical modeling for diacritic restoration may include, e.g., a lexical or surface analysis 104. This may include the analyzing strings or sequences of characters or words. Another source may include syntactic analysis information 106. This looks to the patterned relations that govern the way the words in a sentence come together, the meaning of the words in context, parts of speech, etc. Semantic analysis 112 looks to the meaning of (parts of) words, phrases, sentences, and texts.

Morphological analysis 110 may explore all the possible solutions to a multi-dimensional, non-quantified problem. For example, identification of a word stem from a full word form (e.g., morphemes). In addition, any other information 108 may be employed which is helpful in training statistical models.

Figure 2:
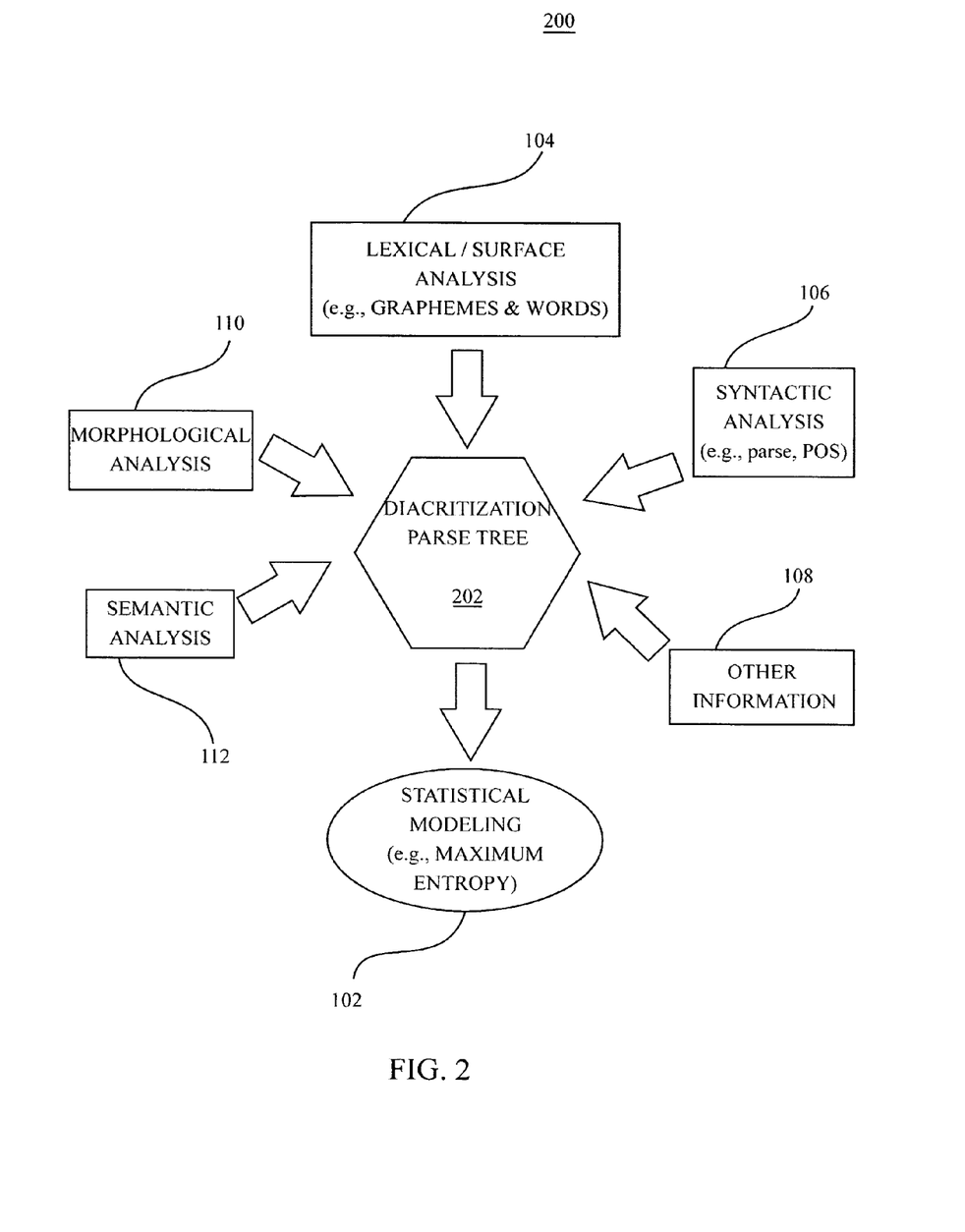
FIG. 2 is a block diagram showing possible information sources for building an diacritization parse tree for inputting information into a diacritization model in accordance with another illustrative embodiment.

Referring to FIG. 2, a block diagram shows a diacritization parse tree (DPT) 202 organizing information sources in an alternate system 200. Compact information integration using DPT 202 and statistical modeling for diacritization is provided. Different sources of information can be integrated into a Diacritization Parse Tree (DPT) 202. The DPT 202 is a joint description of all information that is used for diacritic prediction. System 200 employs graphemes and words (from block 104), morphological units (from block 110), parts of speech (POS) tags and syntactic analysis (from block 106), semantic analysis (from block 112) and other linguistic features (from block 108) to jointly be represented within a single DPT 202. Any information extracted from the Diacritization Parse Tree (DPT) in the form of features can be used to train the model/method 102.

The statistical method 102 (e.g., Maximum Entropy) extracts all the features from this diacritization parse tree 202. The DPT 202 not only presents a compact way to represent multiple sources of information, but DPT 202 also has the advantage of being used for prediction. For example, the leaves (diacritics) and other features of the DPT 202 can be predicted as presented in FIG. 3.

The DPT 202 not only integrates and represents all sources of information compactly, but provides a function that increases accuracy by permitting all nodes (e.g., words or phrases) as well as leaves (diacritics) to be predicted. By predicting the whole tree (leaves and internal nodes), a history can be developed (e.g., by comparing predicted results to the actual words or diacritics in the tree) and improved performance can be achieved. The tree 202 can be used to predict what the word, part of speech, morphology, diacritics, etc. should be and based on this additional information provide more accurate decoding by being able to predict the appropriate word, grapheme, diacritic representation, etc.

Figure 3:
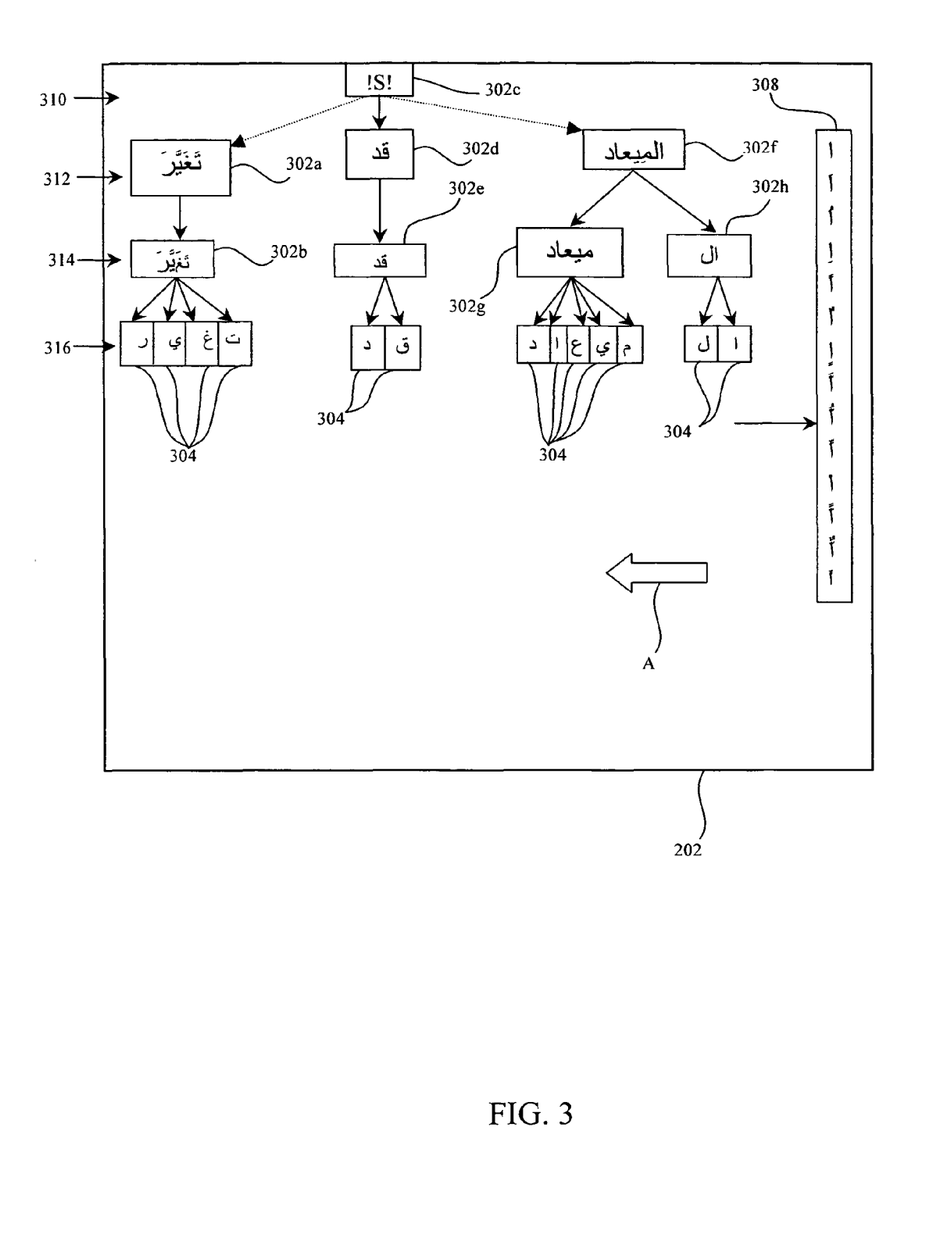
FIG. 3 is an illustrative parse tree showing the parsing of an Arabic sentence for the application of diacritics in accordance with an illustrative embodiment.

Referring to FIG. 3, an integration of morphological units, words, graphemes, and previously predicted diacritics is provided in this example of DPT 202. While FIG. 3 illustratively shows morphology, words, graphemes, and previously predicted diacritics as information sources, other information sources may be used in addition to or instead or those depicted. Nodes 302 and leaves 304 for the tree 202 are illustratively shown decomposing an Arabic sentence S (302c) at a top level 310. Nodes 302f, 302d and 302a show the words of the sentence at a next level 312 of the hierarchy of the tree 202. At a next level 314, the words are separated into prefixes and suffixes. This applies, e.g., to the first word of the sentence which is separated in nodes 302g and 302h. Leaves 304 represent the graphemes which are subjected to diacritics to add vowel representation to the graphemes.

A first word 302f is split into a prefix 302g and a stem 302h according to the Arabic morphology. The words are processed in the order shown by arrow "A" (first word in the sentence to the last word but right to left in FIG. 3). Also, in case some words are already diacritized, they can be used within this same framework. Having partially diacritized sentences will obviously help restore diacritics of the remaining undiacritized words.

For example, a last word 302a of the sentence S in FIG. 3 is diacritized while the first two words 302d and 302f may not be. Nevertheless, if none of the words are diacritized, this method is still effective to achieve full diacritization of the words in the sentence 302c.

The DPT 202 organizes the sentence 302c in a hierarchical manner in which information associated with each segment, prefix, stem, grapheme and other high level labels (e.g. POS, semantic, syntactic, etc.,) can be represented jointly. The joint model enables combining different information sources within a single model to improve performance.

Although, FIG. 3 shows lexical and morphological analyses, other features may and should be considered to provide diacritics to the graphemes at level 316 of the tree 202. Advantageously, the joint modeling using multiple information sources can be employed to predict all nodes 304 (used as predicted output) in the DPT 202. This benefits the diacritization accuracy.

In the example, based on the maximum entropy model, a best solution for diacritics of grapheme 318 is determined from block 308. FIG. 3 illustratively shows the diacritic possibilities for grapheme 318; however, it should be understood that the same analysis may be performed for each letter (grapheme) to determine if diacritics are needed with the consonant to represent vowel sounds.

Referring to FIGS. 2 and 3, the Maximum Entropy Model 102 may be employed for Diacritic Restoration using the DPT 202 as input. In diacritization, the probability, P(D), of a diacritization sequence, D, is estimated for a sentence 302c. However, it is possible to jointly calculate the probability of D and the diacritization parse tree, DPT 202 within a single model. DPT 202 is built for each sentence of the training data. It should be understood that the sources of information do not have to be represented by a DPT 202 (as indicated in FIG. 1). Instead, the sources can be used as distinct features during training and decoding.

Assuming P(D)≈P(D,DPT) every node (token) in the parse tree 202 is considered as an outcome of the joint model.

Note that $$P(D, DPT) = \sum_{i=1}^{M} P(t_i | t_1, \ldots t_{i-1})$$

where $t_i$ represents a node in DPT 202.

Also note that any question one can ask from the diacritics parse tree 202 is a legitimate feature. As such there are numerous features that can be generated. Some of the question types, q(h), may include the following:

1. Unigram history.
2. Previous diacritics (for bigram features, skipping word nodes).
3. Two previous diacritics (for trigram features, skipping word nodes).
4. Grapheme bigram.
5. Grapheme trigram.
6. Number of diacritics since the beginning of the current word and the current word.
7. Number of diacritics since the beginning of the current word, current word and previous diacritic.

Token 4 gram.

The "best" feature set depends on the task, type of diacritization parse tree 202 and amount of data. The features obtained from the diacritization parse tree 202 are used to model state observation probabilities.

In one example, diacritization starts by assigning probabilities to each diacritic in a diacritic lattice 308 (e.g., see the listed diacritics in TABLE 1 and TABLE 2.) This is performed for each grapheme in the tree 202. The best diacritic (or no diacritic) can then be applied to each grapheme in the words of the utterance.

TABLE 2

| Combined diacritics with ﺝ | Name |
|---|---|
| ﺝ | NULL |
| ﺝ | Fatha with Shada |
| ﺝ | Damma with shadda |
| ﺝ | Kasra with shadda |
| ﺝ | Tanween al-fathawith shadda |
| ﺝ | Tanween ad-dammwith shadda |
| ﺝ | Tanween al-kasrwith shadda |

Figure 4:
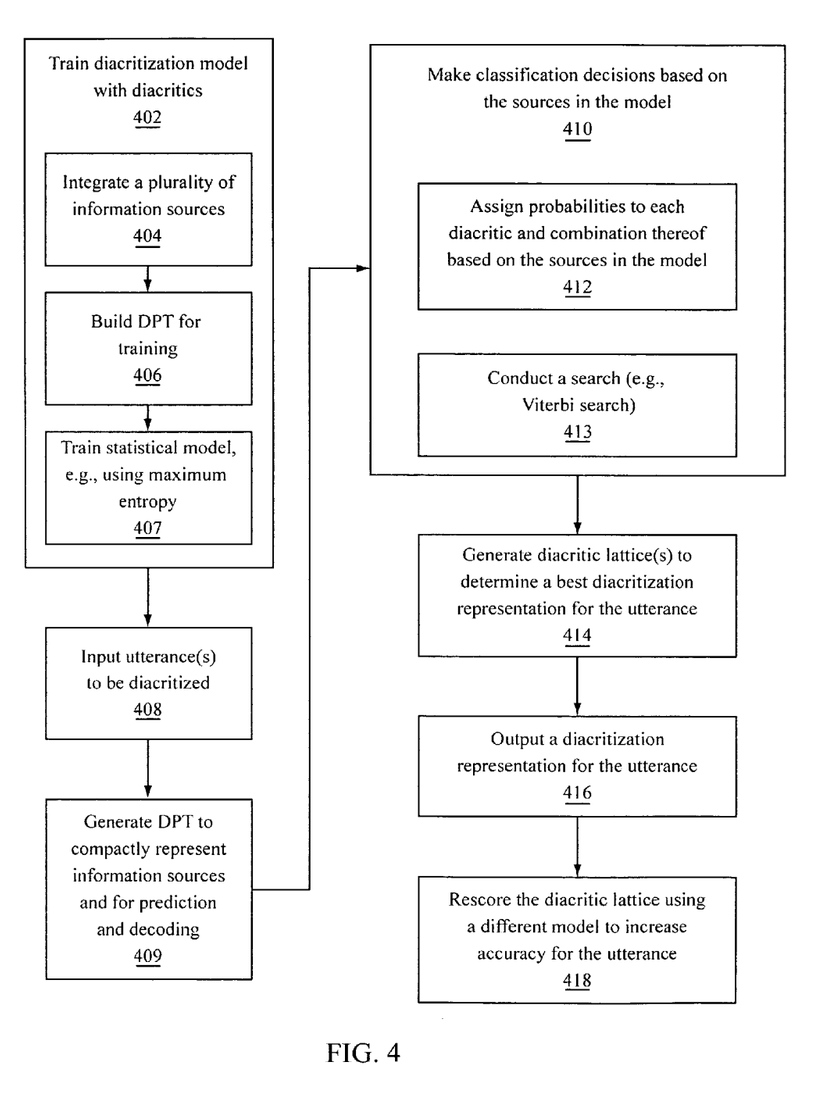
FIG. 4 is a block/flow diagram showing training a diacritization model and decoding utterances to apply diacritics in accordance with an illustrative embodiment.

Referring to FIG. 4, a method for training a diacritization model and applying or restoring diacritics in a Semitic language or code is illustratively shown. In block 402, a diacritization model (e.g., maximum entropy) is trained for applying diacritics. This model may be included in a speaker recognition system, a text to speech system, speech to speech system or any other language modeling system. Methods for training models include applying information from a plurality of information sources to create features used for identifying graphemes and their proper diacritic representation. The sources of information may be employed as distinct features during training and decoding. The plurality of information sources, illustratively depicted in FIGS. 1 and 2, may include non-overlapping and overlapping sources of information.

In block 404, a plurality of sources of information is integrated to train the diacritization model. In one preferred embodiment, the language model is trained using a Maximum Entropy technique in block 407. Other embodiments include training the model using one or more of support vector machines, boosting, statistical decision trees, and/or their combinations to restore diacritics or to generate a diacritic lattice.

The model may be trained using one or more of the following sources of information: previously predicted diacritics, graphemes, morphological units, words, part-of-speech (POS) tags, syntactic information, semantic analysis, linguistic knowledge, etc. It should be understood that prediction information generated by the model to assign a prediction score to the nodes and leaves of the DPT may also be employed after the DPT is built or while building the DPT in block 406. The diacritization model preferably includes a model that restores a complete set of diacritics to an utterance.

It should be noted that the system may include written text (without vowels), speech, or other data to be converted to text or synthesized speech.

In block 406, a diacritization parse tree (DPT) for training may be built and employed to decompose sentences and words. Building a Diacritization Parse Tree (DPT) may be employed to extract information in the form of features to train the diacritization model. The actual statistical diacritization model is trained, using, e.g., maximum entropy, in block 407.

In block 408, an utterance to be diacritized may be input for decoding using the restoration method described herein. The input or test utterance may include written or printed text, electronic signals, acoustic speech or any other form.

In block 409, a DPT is generated for the test utterance to compactly represent information sources for prediction and decoding. The diacritization model which includes a statistical model able to learn the DPT, such that each node in the DPT can be predicted and decoded. Therefore, during decoding, the diacritization model may be employed to predict and determine a best solution for adding diacritics to a grapheme. It should be understood that the diacritization model may be constrained to learn leaves of the DPT that correspond to diacritics only. In this way, the model may include the specialized use of diacritic restoration.

In block 410, classification decisions are made regarding an utterance in accordance with an aggregate of a plurality of information sources in a language model for diacritic restoration. In block 412, diacritization starts by assigning probabilities to each diacritic and diacritic combinations (see e.g., the diacritics and combinations in Tables 1 and 2, respectively) based upon the plurality of information sources and analyses provided in the model. Each entry, in Tables 1 and 2, assigned a probability is treated as a unit in assigning the diacritics and combinations to graphemes. Each grapheme is treated as a state emitting a diacritic.

The Arabic grapheme ل(lam) is used as an example in TABLES 1 and 2. The probability assigned is based upon one or more of previously predicted diacritics, graphemes, morphological units, words, part-of-speech (POS) tags, syntactic information, semantic analysis, and linguistic knowledge.

In block 413, a Viterbi search or similar search is conducted by aligning the most likely diacritic sequence to the grapheme sequence in the right-to-left direction for the whole sentence to determine the probabilities. The individual diacritic probabilities for each grapheme are obtained using Maximum Entropy models.

Modeling state distributions using Maximum Entropy may employ features that are longer in span than the graphemes. Hence, prediction of next diacritics depends not only on current diacritic and current grapheme but also previous diacritics, current word, previous word, next word or some other high level semantic and syntactic units that may span several words.

Therefore, a Viterbi search that permits multiple alternative diacritics per grapheme and then finds the best diacritic sequence through back-tracing may not be fully warranted. A first order Markov chain assumption which states that history has no influence on the chain's future evolution if the present is specified, is not fulfilled for this problem for the reasons mentioned above.

Nevertheless, keeping the most likely diacritic candidate for each grapheme may not take full advantage of the true Viterbi search but can provide highly accurate results to be used for consecutive predictions.

In block 414, a diacritic lattice is generated for each grapheme to determine a best diacritic representation for the graphemes of the input utterances based upon a best match with the diacritization model. Diacritics or combinations of diacritics are assigned to each grapheme, as appropriate, based on a highest probability or best score. In some situations, multiple diacritics are assigned to a grapheme, such as a short vowel with a shadda. In other instances no diacritics are needed or assigned. This is performed for all diacritics and combinations in the language or code. The output is therefore restored such that all vowels are provided in the output text or synthesized speech.

In block 416, a diacritically restored representation of utterances is output. The output includes a diacritically restored representation. The output may be in form of written or printed text, synthesized speech, an electronic representation or another other form which represents a restored diacritic representation.

In block 418, a lattice of diacritics may be rescored with an alternative model or models to improve the accuracy. Using multiple models, may improve the diacritization accuracy.

Figure 5:
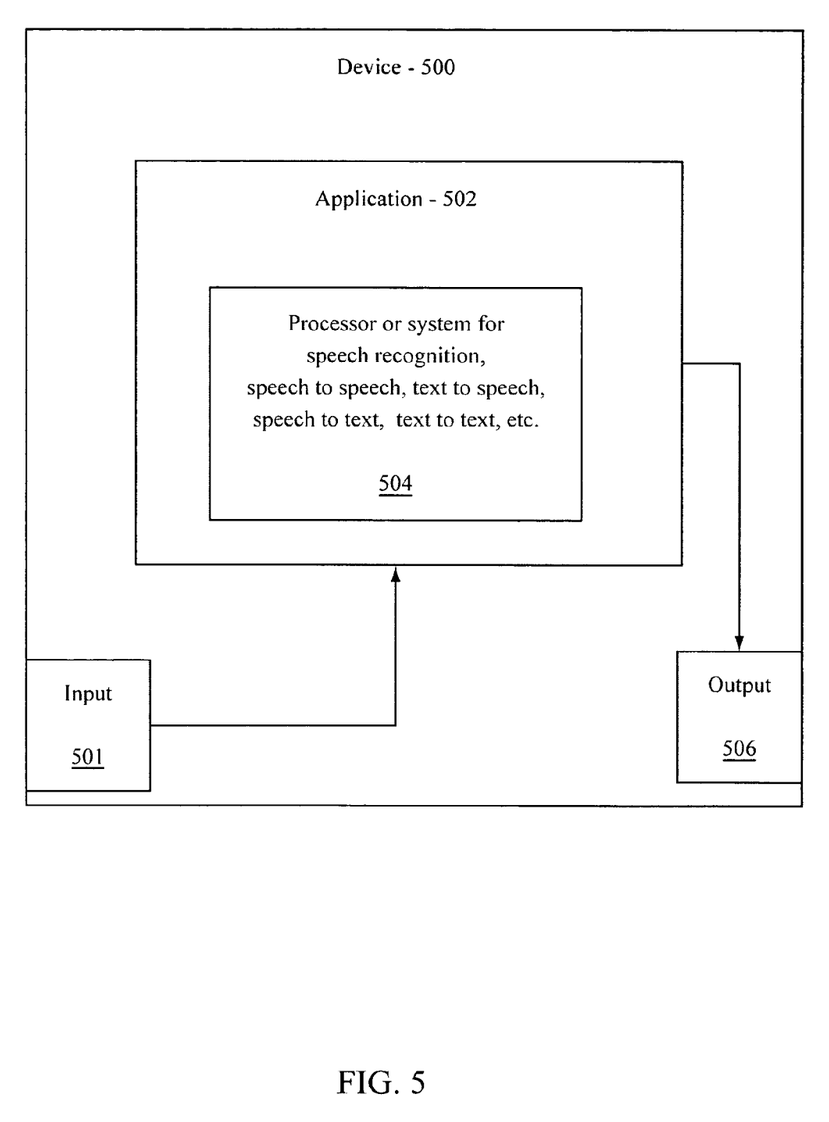
FIG. 5 is a diagram showing a device which employs a diacritization restoration system in accordance with an illustrative embodiment.

Referring to FIG. 5, a system for providing a diacritization restoration is illustratively depicted. A device or system 500 may include cellular telephone, a personal digital assistant, a computer, or other device capable of supporting a software application or module 502. Application 502 may include a speech recognition system, speech to speech system, text to speech system 504 or other processing module capable of diacritization restoration as set forth in FIG. 4. In one embodiment, text messages or input text is reviewed by device 500 to determine diacritics to be added to the text. An input module 501 may include a scanner, a receiver of electrical or optical signals, a microphone or any other input device. Then, the text is restored and output as synthesized speech or text by an output module 506. Output module 506 may include a speech synthesizer, a printer, recording media, etc. It should be understood that Semitic language are often written without diacritics and that despite there absence the text can be easily read by those fluent in the language. However, the vowel sounds are not easily reproduced, especially by a computer without the embodiments of the present invention restoring the diacritics in the text.

Having described preferred embodiments of a system and method for diacritization of text (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method of inserting diacritics into an input language sample, the method comprising:
   generating, with at least one processor, a set of diacritics for at least one grapheme in the input language sample;
   assigning a probability to each diacritic and/or diacritic combination in the set of diacritics, wherein each probability is determined based, at least in part, on a diacritization model that jointly models a weighted sum of a first plurality of information source types associated with the input language sample, wherein at least two of the first plurality of information source types are selected from the group consisting of lexical analysis, syntactic analysis, semantic analysis, and morphological analysis;
   building a Diacritization Parse Tree (DPT) based on the input language sample;
   generating a diacritic lattice from the DPT, wherein the diacritic lattice is generated for graphemes in the input language sample to determine a best diacritic representation for the graphemes of the input language sample based on a best match with the diacritization model;

associating at least one diacritic from the corresponding set of diacritics with the at least one grapheme in the input language sample based, at least in part, on the probability assigned to the at least one diacritic, wherein the associating comprises searching the diacritic lattice to determine a best diacritic and/or combination of diacritics for each grapheme in the input language sample; and outputting a diacritically restored representation of the input language sample, wherein the diacritically restored representation includes the associated at least one diacritic for the at least one grapheme in the input language sample.

2. The method of claim 1, wherein the diacritization model includes information for a Semitic language.

3. The method of claim 1, further comprising:
integrating a second plurality of information sources to train the diacritization model.

4. The method of claim 3, wherein the second plurality of information sources used to train the diacritization model comprises previously predicted diacritics, graphemes, morphological units, words, part-of-speech (POS) tags, syntactic information, semantic analysis, and/or linguistic knowledge.

5. The method of claim 1, wherein the diacritization model was trained using a Maximum Entropy technique.

6. The method of claim 1, wherein the diacritization model was trained using support vector machines, boosting, and/or statistical decision trees.

7. The method of claim 1, wherein the associating comprises performing a Viterbi search to determine a best sequence of diacritics and/or diacritic combinations assigned to the input language sample.

8. The method of claim 1, wherein the DPT includes nodes and leaves, the method further comprising:
extracting features from the DPT; and
training the diacritization model using the extracted features.

9. The method of claim 8, wherein the diacritization model includes a statistical model configured to predict each node of the DPT.

10. The method of claim 1, wherein the set of diacritics includes a NULL diacritic that, when associated with the at least one grapheme, does not modify the at least one grapheme.

11. The method of claim 1, wherein the first plurality of information sources comprises non-overlapping and overlapping sources of information.

12. The method of claim 1, further comprising:
assigning probabilities to the diacritics in the diacritic lattice based, at least in part, on at least one model other than the diacritization model.

13. The method of claim 1, wherein outputting a diacritically restored representation includes outputting text and/or speech.

14. The method of claim 1, wherein the input language sample includes text and/or speech.

15. A non-transitory computer readable storage medium encoded with a plurality of instructions that, when executed by a computer, perform a method of inserting diacritics into an input language sample, the method comprising:
generating a set of diacritics for at least one grapheme in the input language sample;
assigning a probability to each diacritic and/or diacritic combination in the set of diacritics, wherein each probability is determined based, at least in part, on a diacritization model that jointly models a weighted sum of a first plurality of information source types associated with the input language sample, wherein at least two of the first plurality of information source types are selected from the group consisting of lexical analysis, syntactic analysis, semantic analysis, and morphological analysis;
building a Diacritization Parse Tree (DPT) based on the input language sample;
generating a diacritic lattice from the DPT, wherein the diacritic lattice is generated for graphemes in the input language sample to determine a best diacritic representation for the graphemes of the input language sample based on a best match with the diacritization model;
associating at least one diacritic from the corresponding set of diacritics with the at least one grapheme in the input language sample based, at least in part, on the probability assigned to the at least one diacritic, wherein the associating comprises searching the diacritic lattice to determine a best diacritic and/or combination of diacritics for each grapheme in the input language sample; and
outputting a diacritically restored representation of the input language sample, wherein the diacritically restored representation includes the associated at least one diacritic for the at least one grapheme in the input language sample.

16. The computer readable storage medium of claim 15, wherein the assigning comprises determining each probability based, at least in part, on distinct features extracted from the diacritization model.

17. An apparatus, comprising:
at least one storage medium;
at least one processor programmed to:
generate a set of diacritics for at least one grapheme in the input language sample;
assign a probability to each diacritic and/or diacritic combination in the set of diacritics, wherein each probability is determined based, at least in part, on a diacritization model that jointly models a weighted sum of a first plurality of information source types associated with the input language sample, wherein at least two of the first plurality of information source types are selected from the group consisting of lexical analysis, syntactic analysis, semantic analysis, and morphological analysis;
build a Diacritization Parse Tree (DPT) based on the input language sample;
generate a diacritic lattice from the DPT, wherein the diacritic lattice is generated for graphemes in the input language sample to determine a best diacritic representation for the graphemes of the input language sample based on a best match with the diacritization model;
associate at least one diacritic from the corresponding set of diacritics with the at least one grapheme in the input language sample based, at least in part, on the probability assigned to the at least one diacritic, wherein the associating comprises searching the diacritic lattice to determine a best diacritic and/or combination of diacritics for each grapheme in the input language sample; and
output a diacritically restored representation of the input language sample, wherein the diacritically restored representation includes the associated at least one diacritic for the at least one grapheme in the input language sample.

* * * * *